United States Patent
Prust

(10) Patent No.: US 6,242,712 B1
(45) Date of Patent: Jun. 5, 2001

(54) AIR HEATER WITH PERFORATED RESISTANCE ELEMENT

(75) Inventor: Andrew J. Prust, Coon Rapids, MN (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 0 days.

(21) Appl. No.: 09/309,680

(22) Filed: May 11, 1999

(51) Int. Cl.[7] ................................................ B60L 1/02
(52) U.S. Cl. .................... 219/206; 123/549; 392/398; 392/485; 219/534; 219/535
(58) Field of Search ............................. 219/202, 205, 219/206, 207, 400, 522, 523, 534, 535, 530, 544, 551; 123/549, 546, 590, 593; 392/398, 424, 478, 485, 486, 487, 488, 489, 490, 491, 492, 493, 494

(56) References Cited

U.S. PATENT DOCUMENTS

| | | |
|---|---|---|
| 1,136,845 | 4/1915 | Tate . |
| 2,561,928 * | 7/1951 | Johnston ............................. 392/485 |
| 3,625,190 | 12/1971 | Boissevain . |
| 3,892,215 | 7/1975 | Hickling et al. . |
| 4,025,754 * | 5/1977 | Marzonie et al. .................... 219/400 |
| 4,308,845 * | 1/1982 | Sarto .................................. 123/549 |
| 4,448,173 * | 5/1984 | Abe et al. ............................ 123/549 |
| 5,028,763 * | 7/1991 | Chung-Tai ........................... 219/530 |
| 5,125,070 * | 6/1992 | Chung-Tai ........................... 392/485 |
| 5,206,476 * | 4/1993 | Fresch et al. ........................ 392/485 |
| 5,224,973 * | 7/1993 | Hoppenstedt et al. .............. 219/535 |
| 5,409,669 * | 4/1995 | Smith et al. ......................... 219/535 |
| 5,649,049 | 7/1997 | Abe et al. . |
| 5,651,088 * | 7/1997 | Abe et al. ............................ 392/494 |
| 5,664,049 | 9/1997 | Kondo et al. . |
| 5,666,804 | 9/1997 | Sekiya et al. . |
| 5,780,811 * | 7/1998 | Kawamura ........................... 219/206 |
| 5,887,575 | 3/1999 | Thimmesch et al. . |
| 5,988,146 * | 11/1999 | Anderson et al. ................... 123/549 |
| 5,992,399 * | 11/1999 | Anderson et al. ................... 123/549 |

FOREIGN PATENT DOCUMENTS 44 10 820 A1    10/1994   (DE) .

* cited by examiner

Primary Examiner—Teresa Walberg
Assistant Examiner—Fadi H. Dahbour
(74) Attorney, Agent, or Firm—Harness, Dickey & Pierce, P.L.C.

(57) ABSTRACT

A heater for heating air in an intake passage of an internal combustion engine. The heater includes a heating element coupled to a first holder and a second holder. The heating element has a preselected resistance corresponding to plurality apertures formed therethrough. A second embodiment includes a heating element positioned within a housing. The heating element includes a plurality of selectively removable slugs. After removal of one or more of the slugs, the electrical resistance of the heating element increases.

10 Claims, 5 Drawing Sheets

AIR HEATER WITH PERFORATED RESISTANCE ELEMENT

BACKGROUND OF THE INVENTION

1. Technical Field

The invention generally relates to an apparatus for heating the air/fuel mixture entering the cylinders of an internal combustion engine. More particularly, the invention relates to an electric heater element having a resistance that may be varied to suit specific applications.

2. Discussion

The air/fuel mixture entering the cylinders of an internal combustion engine is commonly heated to increase fuel economy and responsiveness to starting as well as to decrease pollutant discharge. One type of intake heating device generally includes a heating element or coil electrically connected to a power source and disposed in the intake air passageway of an engine. In the afore-referenced device, current is passed through the heating element or coil to increase the temperature of the surrounding air as it enters the air intake manifold.

While the aforementioned heaters generally address cold starting and fuel economy issues, other concerns remain. One concern is design flexibility. For example, if a heating element is electrically connected to a power source with a fixed voltage supply, such as a vehicle battery, the element emits a fixed amount of heat energy. However, the amount of heat required can vary depending upon the specific heater application. Factors such as ambient air temperature, engine displacement, intake air passageway cross-sectional area and intake gas volume flow rate influence the amount of heat energy required to raise the air/fuel mixture temperature. Accordingly, a manufacturer may wish to vary the amount of heat energy or wattage dissipated from a heater without varying the supply voltage. This is especially true in heater applications for motor vehicles where one portable battery supplies power to the vehicle and varying the voltage supplied to the heater is cumbersome and expensive.

In general, a manufacturer of prior art heaters was afforded minimal control over the resistance of a heating element. Known methods of varying the resistance include modifying the thickness and/or the length of the element. As such, heaters of different capacities often required heating elements of vastly different geometry. As would be expected, the components designed to cooperate with the heating elements were also required to change. For example, an increase in length often required a corresponding change in insulators. A change in the insulators often forced a change in the holders or other retention device. Ultimately, the use of a different heating element could ripple throughout the entire design, possibly requiring a proportionately sized housing and intake opening.

Accordingly, prior heaters equipped with fixed resistance heating elements may be improved upon to provide the additional design flexibility of variable power output. Specifically, one practicing the disclosed invention may vary resistance without changing the external dimensions of the element thereby allowing different heating capacities in the same heater housing. Original equipment manufacturers attempting to reduce component inventory by using one heater in a variety of different applications will find use for such an improved heater.

Another concern exists as to the temperature homogeneity of the heated air as it enters the combustion chamber. It is desirous to produce a uniformly heated volume of air in order to enhance cold starting conditions and efficient combustion. Existing heater designs simply allow the unheated air to pass by round wires or flat element sections in a generally laminar manner. Heat transfer from the heating element to the air may be increased through the introduction of turbulent flow.

In view of the above concerns as well as the manufacturer's ever present desire to reduce manufacturing costs and complexity, a need exists for a heater element with variable resistance that may be inexpensively manufactured, and utilized in a variety of applications. Additionally, a need exists for a heater that produces a more uniformly heated supply of air to the engine.

SUMMARY OF THE INVENTION

Accordingly, it is an object of the invention to provide a heater with a heating element having a resistance specifically tailored to the heating requirements of a particular application.

It is a further object of the present invention to provide a heating element having apertures formed therein to selectively increase the resistance of the heating element for a particular application.

It is still another object of the present invention to provide a heating element having apertures formed therein to increase the heat transfer characteristics from the heating element to passing airflow.

A first embodiment of the invention depicts a heater for heating air in an intake passage of an internal combustion engine. The heater includes a heating element having a plurality of apertures for increasing the resistance of the heating element. In a second embodiment, the heating element includes a plurality of selectively removable slugs. After removal of one or more of the slugs, the electrical resistance of the heating element increases.

BRIEF DESCRIPTION OF THE DRAWINGS

Other objects and advantages of the invention will become apparent to one skilled in the art upon reading the following specification and subjoined claims and upon reference to the drawings in which:

DETAILED DESCRIPTION OF THE PREFERRED EMBODIMENT

Figure 1:
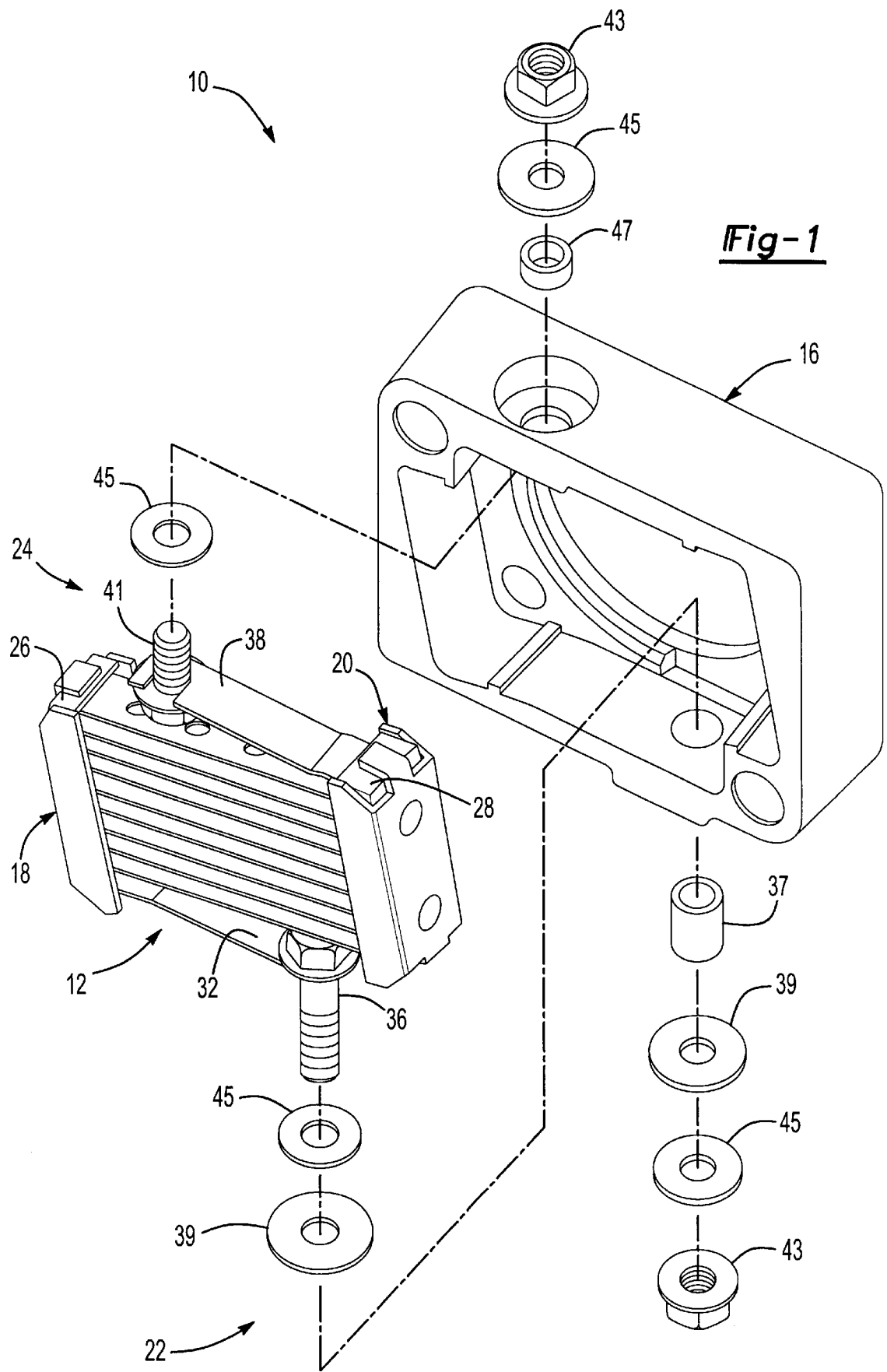
FIG. 1 is an exploded perspective view of a heater assembly having a heating element according to the present invention.
Figure 2:
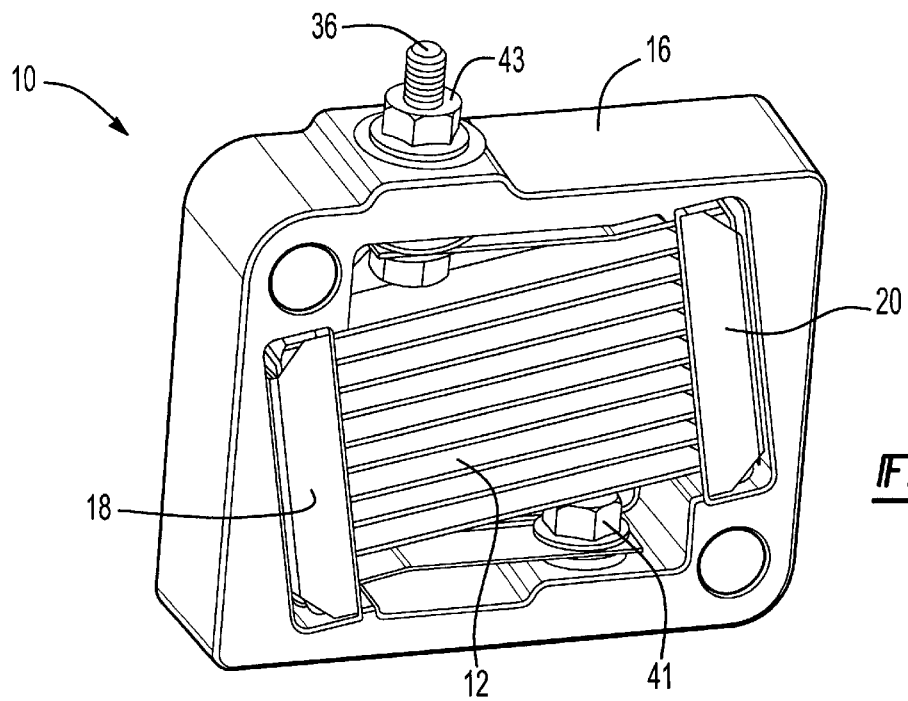
FIG. 2 is a perspective view of the assembled heater shown in FIG. 1.

With reference to FIGS. 1 and 2, a first embodiment of a heater assembly 10 including a perforated heating element 12 of the present invention is connectable to an intake passage of an internal combustion engine. Heater assembly 10 includes a housing 16, a first holder 18 and a second holder 20, bolt assemblies 22 and 24, and ceramic insulators 26 and 28 disposable within holders 18 and 20. Perforated heating element 12 is retained within the holders and ceramic insulators as shown. Bolt assembly 22 mechanically couples a first end 32 of heating element 12 to housing 16, electrically connects first end 32 to a power source (not shown) via bolt 36, and includes an insulating sleeve 37 and washers 39 to electrically isolate the bolt from the housing. Bolt assembly 24 includes bolt 41 to mechanically and electrically couple a second end 38 of heating element 12 to housing 16. A seal 47 is positioned between bolt 41 and housing 16 in order to prevent ingress of contaminants. As a result of this configuration, current passes from a power source connected to first bolt assembly 22 through heating element 12 and to ground via bolt assembly 24 and housing 16. One skilled in the art will appreciate that each of bolt assemblies 22 and 24 further include standard washers 45 and nuts 43 to complete the fastening procedure.

As will be appreciated from the following description, the present invention provides a heating element that allows an original equipment manufacturer to utilize one heater configuration in a variety of applications. Specifically, if a manufacturer desires to provide air intake heaters across a product line including a variety of engines for use in different vehicles, a need is created for heaters providing a range of wattage output. By incorporating the present invention, a heater manufacturer no longer needs to vary the length or cross section of the heating element in order to increase the resistance therein. As a result, the present invention also eliminates any need for correspondingly sized holders, ceramic insulators and housings. Additionally, the interface between the heater and the engine may remain the same for different heater capacities. These and other advantages flow from the present inventions as an end user may simply vary the resistance of the heating element as hereinafter described to produce the desired heat output. As such, the claimed invention provides a cost avoidance tool by reducing product proliferation.

Figure 3:
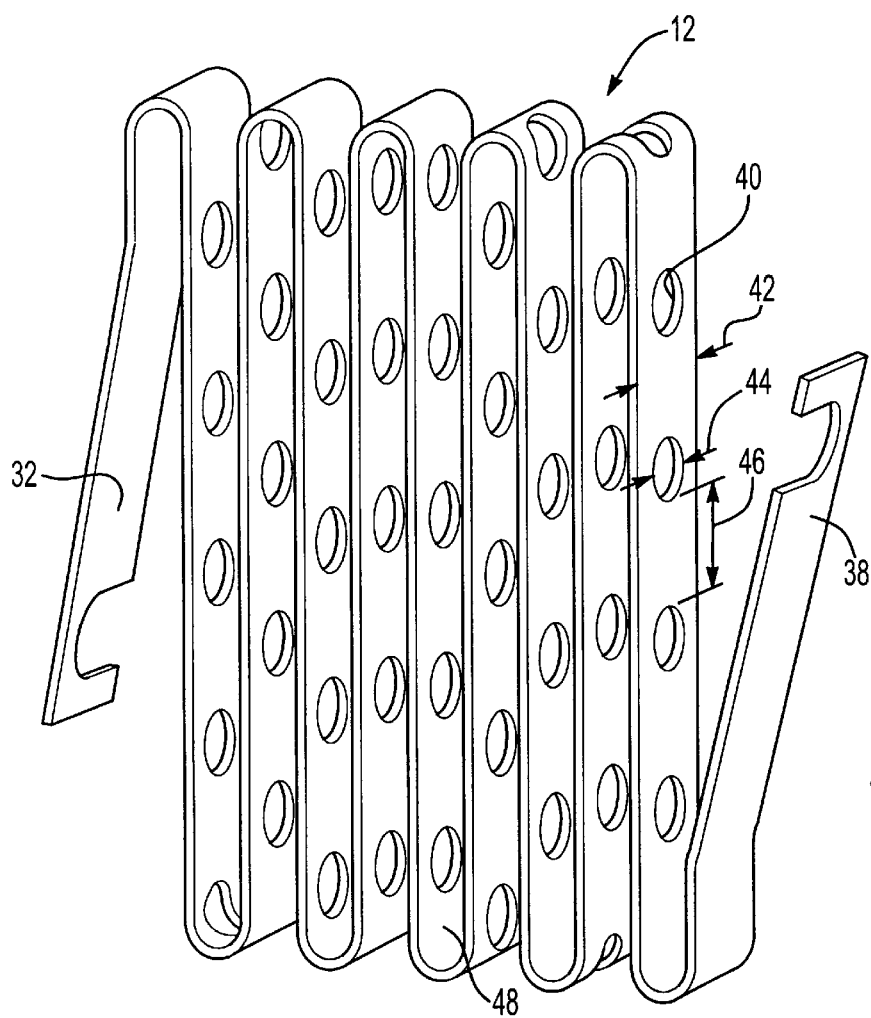
FIG. 3 is a perspective view of the perforated heating element shown in FIGS. 1 and 2.

As best illustrated in FIG. 3, heating element 12 has a serpentine configuration defining a center section 48 bounded by first and second ends 32 and 38. A plurality of apertures 40 are axially spaced apart along the length of heating element 12. Each aperture 40 locally reduces the cross sectional area of heating element 12 thereby increasing the electrical resistance. While FIGS. 1–3, 6, and 7 illustrate the apertures being centered within the width of the heating element, the apertures may be positioned off-center such as providing the heating element 12 with semi-circular recesses 40a extending inwardly from one or more sides 33 of the element (FIG. 8). One skilled in the art will further appreciate that the heating element of the present invention may be utilized in any variety of applications and the housing depicted is merely an example of such use.

Figure 4:
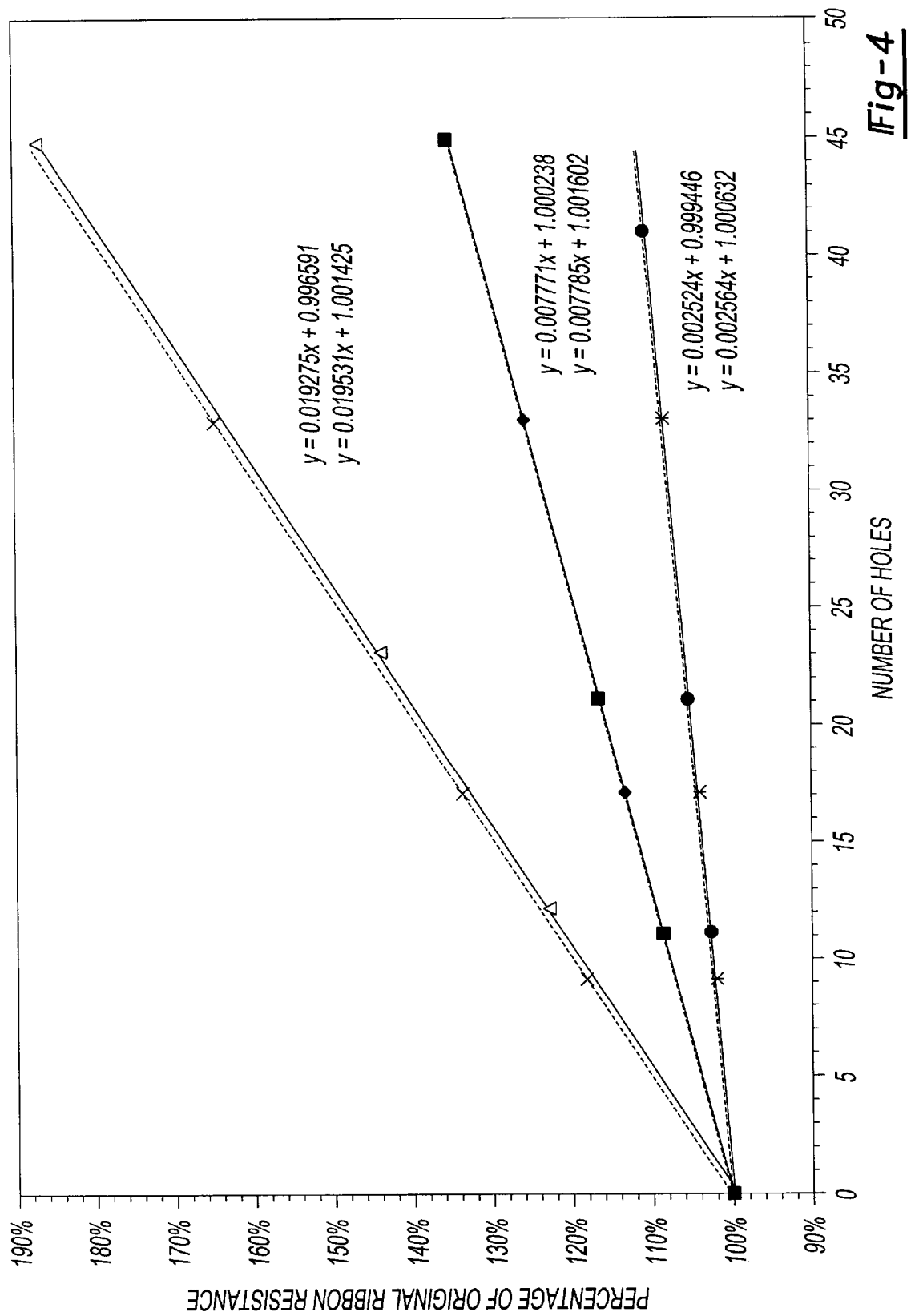
FIG. 4 is a graph of element resistance versus number of holes.
Figure 5:
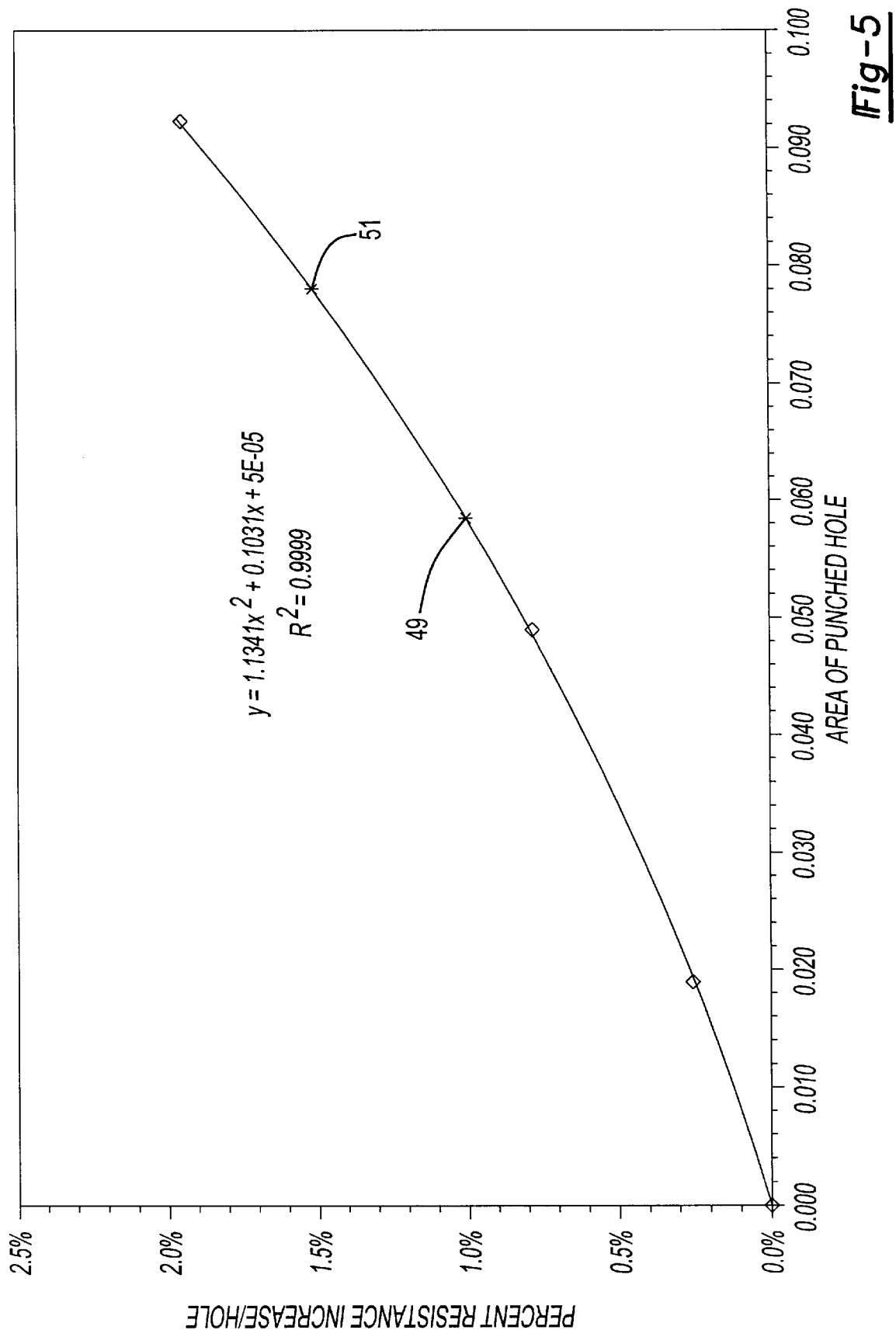
FIG. 5 is a graph of percent resistance increase per hole versus area of the hole.

Apertures 40 are specifically sized and shaped to produce a quantified increase in resistance throughout the heating element. As shown in FIGS. 4 and 5, heating element electrical resistance is a function of the number and size of the holes placed along the length of the element. Given a power source, one employing the teachings of the invention may custom tailor a heating element to produce a specific quantity of heat energy.

One skilled in the art will appreciate that a family of heating elements may be created. Each element of a family is manufactured from a common ribbon or wire of given width 42 and length. Accordingly, each of the elements within a family may be mounted within insulators and holders of the same size. While the reader should appreciate that an infinite number of heating elements containing different aperture sizes and quantities may be constructed, FIG. 4 plots the resistance change obtained within only a few specific embodiments. As shown in this Figure, it is possible to nearly double the resistance of one heating element by adding relatively large, closely spaced apertures 40 to the element. To achieve such an increase in resistance, forty five circular apertures of 0.34 inches in diameter were equally spaced along a one-half (0.5) inch wide element. The magnitude of reduction in cross sectional area of a current carrying member has a limit due to local overheating and subsequent loss of mechanical properties. Care must be taken to avoid element sagging that could lead to shorting the circuit or melting the element causing electrical discontinuity. As a guideline, the maximum aperture width 44 preferably does not exceed three-fourths of the width 42 of the ribbon (FIG. 3). Moreover, in order to maintain the structural integrity of the heating element, a preferred spacing 46 between apertures is at least one aperture diameter.

FIG. 5 is a compilation of the data found in FIG. 4 reflecting the exponential relationship of percent resistance increase per aperture to the area of each aperture. FIG. 5 is best used as a design tool to predict the size and number of apertures required to create a given increase in resistance. For example, if a customer proposed a use requiring 30% less heat energy input than a standard heater currently offered, a heater element could be designed to satisfy both the existing packaging requirements and the new heat energy requirements. Two examples of specific heating elements obtaining the desired 30% increase in resistance are illustrated below. Referring to point 49 shown in FIG. 5, a heating element containing thirty 0.059 square inch apertures would meet the requisite increase. A heating element constructed as depicted at point 51 of FIG. 5 containing twenty 0.078 square inch apertures would also create the desired 30% increase in resistance. Because the power emitted from a heating element is directly related to the element's resistance, great flexibility over the output energy of the heater is obtained.

Figure 6:
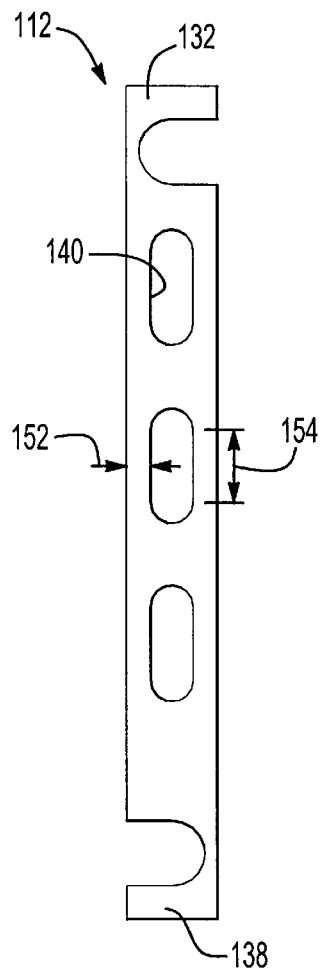
FIG. 6 is a top view of a second embodiment of a heating element with elongated apertures.

In addition, the electrical resistance of the heating element may be modified by altering the shape of the apertures. FIG. 6 depicts a second embodiment of the heating element where features similar to those illustrated and described above with reference to FIGS. 1–3 are indicated by like numerals increased by 100. Accordingly, heating element 112 includes a first end 132, a second end 138 and elongated apertures 140. Elongated apertures 140 create an increase in resistance greater than the increase created by the circular apertures previously described. The elongated shape of apertures 140 create a reduced cross-section 152 for a length 154 substantially longer than that created by circular apertures 40. Because electron flow is restricted for a longer length, resistance is further increased. One skilled in the art will appreciate that the shape and size of the apertures disclosed in the preferred embodiments are merely exemplary and may be varied without departing from the scope of the invention defined by the appended claims.

Figure 7:
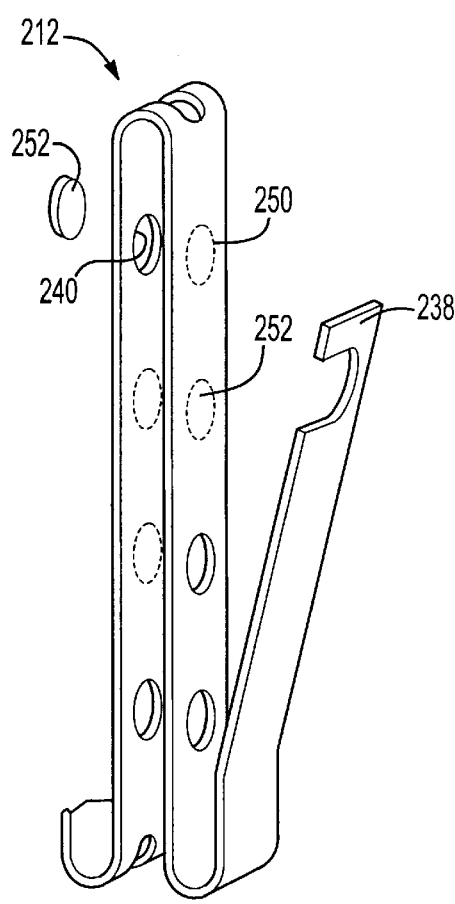
FIG. 7 is a partial perspective view of a third embodiment of a heating element with perforations.
Figure 8:
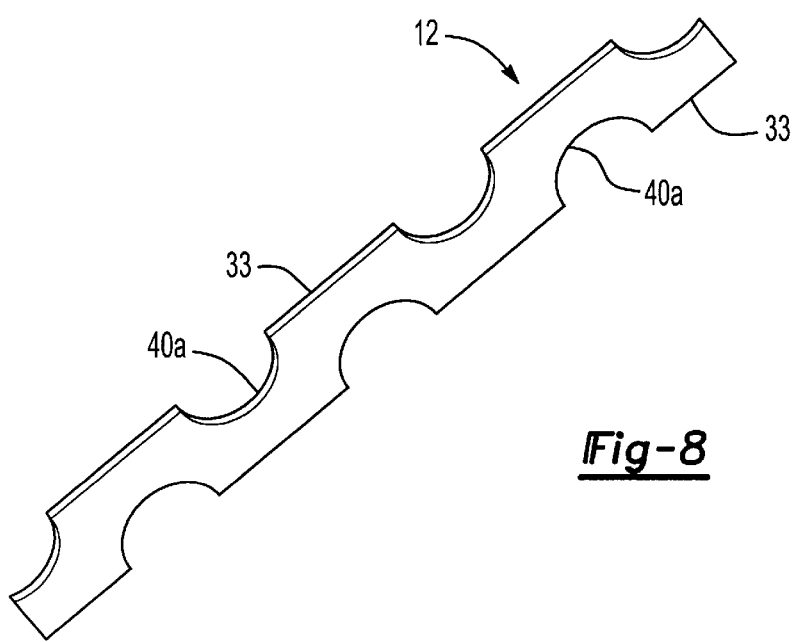
FIG. 8 is a perspective view of a fourth embodiment of a heating element with apertures.

A third embodiment of the present invention is illustrated in FIG. 7 where like components are identified with reference numerals increased by 200. Heating element 212 includes a plurality of perforations 250 defining a plurality of slugs 258. Each slug 258 may be selectively removed to form an aperture 240. As earlier described, once an aperture is formed, the cross sectional area of heating element present at that specific location is reduced. Accordingly, less heating element path is available to carry electrons from first end 232 to second end 238 thereby causing an increase in the resistance of heating element 212. Again, once the relationship between electrical resistance and heating element configuration is understood, a set of curves similar to those shown in FIGS. 4 and 5 may be created. Accordingly, a custom tailored air heater may be created by simply punching out the requisite number of slugs 258 thereby creating a new heating element of desired resistance.

Each embodiment provides a further benefit of producing turbulent air flow as air passes perforated heating element 12. The production of turbulent air flow aids in the transfer of heat from heating element 12 to the surrounding air. Accordingly, a more uniformly distributed charge of heated air will enter the combustion chamber.

What is claimed is:

1. A method for constructing a modular intake air heater comprising:

selecting a desired heat energy output;

determining an input power source voltage;

providing a heating element having a first end and a second end, said heating element having apertures and a first electrical resistance from said first end to said second end;

determining a second electrical resistance required to provide said desired heat energy output given said input power source, said second electrical resistance being greater than said first electrical resistance; and placing additional apertures in said heating element to increase said first electrical resistance to said second electrical resistance.

2. The method of claim 1 further including placing said apertures axially spaced along the length of the heating element.

3. The method of claim 2 wherein the heating element has a width and the apertures have a width no greater than three-fourths of the heating element width.

4. The method of claim 3 further including placing the apertures in spaced apart relation to provide a space between adjacent apertures equal to or greater than the aperture width.

5. The method of claim 1 wherein the apertures are oval in shape.

6. A method of providing a heater having a common housing and a predetermined energy output, the method comprising the steps of:

determining a desired energy output;

providing a first heater element blank having a first end and a second end;

forming a number of apertures in said first heater element blank to produce a first heater element having a first electrical resistance between said first and second ends;

mounting said first heater element to said housing;

coupling said housing to an intake passage of a first engine;

providing a second substantially similar blank having a first end and a second end;

forming a different number of apertures in said second blank to produce a second heater element having a second electrical resistance between said first and second ends;

mounting said second heater element to a second substantially similar housing; and coupling said second housing to an intake passage of a second engine whereby the length and cross-section of said first and second heater element blanks are the same to allow use of similar housings within different engines having different heating requirements.

7. The method of claim 6 wherein each said apertures are axially spaced along each said heating element.

8. The method of claim 7 wherein each said heating element has a width and each said apertures have a width, each said aperture width being no greater than three-fourths of each said heating element width.

9. The method of claim 8 further including the step of inserting a space between each adjacent apertures, each said space being equal to or greater than each said aperture width.

10. The method of claim 9 wherein each said apertures are circular.

* * * * *